US012423689B2

(12) United States Patent
Zhu et al.

(10) Patent No.: US 12,423,689 B2
(45) Date of Patent: Sep. 23, 2025

(54) PAYMENT SERVICE IMPLEMENTATION METHODS AND APPARATUSES

(71) Applicant: Alipay (Hangzhou) Information Technology Co., Ltd., Hangzhou (CN)

(72) Inventors: Bingying Zhu, Hangzhou (CN); Zhi Xin, Hangzhou (CN); Wei Yuan, Hangzhou (CN); Xiaofei Wan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 168 days.

(21) Appl. No.: 18/273,721

(22) PCT Filed: Jan. 13, 2022

(86) PCT No.: PCT/CN2022/071716
§ 371 (c)(1),
(2) Date: Jul. 21, 2023

(87) PCT Pub. No.: WO2022/156585
PCT Pub. Date: Jul. 28, 2022

(65) Prior Publication Data
US 2024/0078543 A1      Mar. 7, 2024

(30) Foreign Application Priority Data
Jan. 22, 2021   (CN) .......................... 202110085399.8

(51) Int. Cl.
G06Q 20/38      (2012.01)
G06F 21/62      (2013.01)
G06Q 20/14      (2012.01)

(52) U.S. Cl.
CPC ....... *G06Q 20/383* (2013.01); *G06F 21/6254* (2013.01); *G06Q 20/14* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

2010/0293099 A1   11/2010   Pauker et al.
2012/0275601 A1*  11/2012   Matsuo ................. H04L 9/0844
                                                     380/282

(Continued)

FOREIGN PATENT DOCUMENTS

CN      105117901 A      12/2015
CN      106899607 A       6/2017

(Continued)

OTHER PUBLICATIONS

Cryptomathic, "Random Number Generators and Their Role in Cryptography", Apr. 23, 2019 (Year: 2019).*

(Continued)

*Primary Examiner* — Jacob C. Coppola
*Assistant Examiner* — Timothy Paul Sax
(74) *Attorney, Agent, or Firm* — Womble Bond Dickinson (US) LLP

(57) ABSTRACT

Embodiments of this specification provide a payment service implementation method and apparatus. According to the method in the embodiments, when a payment service is performed, anonymous processing needs to be performed on original payment account information. First, a random number is used to perform transform processing on the original payment account information, so that information encrypted each time by using a public key is different. Then, the public key and an encryption algorithm obtained in advance are used to encrypt payment account information obtained after the transform processing, so as to obtain anonymous payment account information, thereby completing an anonymous processing process. After anonymous processing is (Continued)

completed, the obtained anonymous payment account information may be used to perform a payment operation.

6 Claims, 6 Drawing Sheets

(56) References Cited

U.S. PATENT DOCUMENTS

| | | | | |
|---|---|---|---|---|
| 2016/0267458 A1* | 9/2016 | Metral | .................. | G06Q 20/20 |
| 2016/0344702 A1* | 11/2016 | Ukena | ................ | G06Q 30/0201 |
| 2016/0371684 A1* | 12/2016 | Abbott | ................ | H04L 63/0421 |
| 2018/0276645 A1* | 9/2018 | Toomer | ............. | G06Q 20/3278 |
| 2021/0399873 A1* | 12/2021 | Duchin | .................. | H04L 9/006 |

FOREIGN PATENT DOCUMENTS

| | | | |
|---|---|---|---|
| CN | 107292599 A | | 10/2017 |
| CN | 107454048 A | | 12/2017 |
| CN | 108134666 A | | 6/2018 |
| CN | 112465507 A | | 3/2021 |

OTHER PUBLICATIONS

The International Search Report and Written Opinion of the International Searching Authority for International Application No. PCT/CN2022/071716 mailed on Mar. 18, 2022.
"European Search Report" for the application No. 22742064.3, mailed on Nov. 18, 2024. pp. 1-10.

* cited by examiner

PAYMENT SERVICE IMPLEMENTATION METHODS AND APPARATUSES

TECHNICAL FIELD

One or more embodiments of this specification relate to the field of information security technologies, and in particular, to payment service implementation methods and apparatuses.

BACKGROUND

In an existing payment service implementation method, either one of a payer and a payee can provide payment account information to the other party, the other party generates a payment bill and provides the payment bill to a server, and the server performs bill deduction processing.

In the existing payment service implementation method, the party that provides payment bill information directly provides original payment account information to the other party, which causes leakage of the payment account information, thereby reducing payment service security. Therefore, a more secure solution is needed to reduce the risk of leakage of the payment account information.

SUMMARY

One or more embodiments of this specification describe payment service implementation methods and apparatuses, which can reduce a risk of leakage of payment account information.

According to a first aspect, a payment service implementation method is provided, applied to a terminal that performs a payment service, and the method includes: generating a random number; performing transform processing on original payment account information of the terminal by using the random number, to obtain transformed payment account information; encrypting the transformed payment account information according to a public key and a first encryption algorithm obtained in advance, to obtain first payment account information; obtaining anonymous payment account information according to the first payment account information; and performing a payment operation by using the anonymous payment account information.

In an embodiment, the generating a random number includes: generating, according to a key length of a second encryption algorithm, the random number whose length is equal to the key length; and the performing transform processing on original payment account information of the terminal by using the random number includes: using the random number as a key of the second encryption algorithm, and encrypting the original payment account information of the terminal by using the second encryption algorithm.

In an embodiment, after the encrypting the original payment account information of the terminal by using the second encryption algorithm, and before the obtaining transformed payment account information, the method further includes: performing first combination processing on the random number and second payment account information to obtain the transformed payment account information, where the second payment account information is payment account information obtained by encrypting the original payment account information of the terminal by using the second encryption algorithm.

In an embodiment, the transformed payment account information does not carry the random number; and the obtaining anonymous payment account information according to the first payment account information includes: performing second combination processing on the random number and the first payment account information to obtain the anonymous payment account information.

In an embodiment, the transformed payment account information carries the random number; and the obtaining anonymous payment account information according to the first payment account information includes: directly determining the first payment account information as the anonymous payment account information.

In an embodiment, the terminal that performs a payment service is a terminal that provides payment account information; and the performing a payment operation by using the anonymous payment account information includes: providing the anonymous payment account information to another terminal.

In an embodiment, the terminal that performs a payment service is a terminal that provides a payment bill to a server; and the performing a payment operation by using the anonymous payment account information includes: generating an anonymous payment bill by using the anonymous payment account information; and sending the anonymous payment bill to the server.

According to a second aspect, a payment service implementation method is provided, applied to a server and including: receiving an anonymous payment bill; obtaining anonymous payment account information from the anonymous payment bill; performing decryption processing by using a preset private key, a first decryption algorithm, and the anonymous payment account information, to obtain transformed payment account information, where the private key corresponds to a public key obtained by a terminal that performs a payment service; obtaining a random number; performing inverse transform processing on the transformed payment account information by using the random number to obtain original payment account information; and performing bill deduction processing according to the original payment account information.

In an embodiment, the transformed payment account information does not carry the random number; the obtaining a random number includes: performing second de-combination processing on the anonymous payment account information, and extracting the random number from payment account information obtained after the second de-combination processing; and the performing decryption processing by using a preset private key, a first decryption algorithm, and the anonymous payment account information includes: extracting first payment account information from the payment account information obtained after the second de-combination processing; and decrypting the first payment account information by using the private key and the first decryption algorithm.

In an embodiment, the transformed payment account information carries the random number; the performing decryption processing by using a preset private key, a first decryption algorithm, and the anonymous payment account information includes: decrypting the anonymous payment account information by using the private key and the first decryption algorithm; and the obtaining a random number includes: performing first de-combination processing on the decrypted payment account information, and extracting the random number from payment account information obtained after the first de-combination processing.

According to a third aspect, a payment service implementation apparatus is further provided, where the apparatus is disposed in a terminal that performs a payment service, and the apparatus includes: a random number generation unit, configured to generate a random number; a transform processing unit, configured to perform transform processing on original payment account information of the terminal by using the random number, to obtain transformed payment account information; an encryption processing unit, configured to encrypt the transformed payment account information according to a public key and a first encryption algorithm obtained in advance, to obtain first payment account information; an anonymous account determining unit, configured to obtain anonymous payment account information according to the first payment account information; and a payment processing unit, configured to perform a payment operation by using the anonymous payment account information.

In an embodiment, the random number generation unit is configured to generate, according to a key length of a second encryption algorithm, the random number whose length is equal to the key length; and the transform processing unit is configured to: use the random number as a key of the second encryption algorithm, and encrypt the original payment account information of the terminal by using the second encryption algorithm.

In an embodiment, the transform processing unit is further configured to perform first combination processing on the random number and second payment account information to obtain the transformed payment account information, where the second payment account information is payment account information obtained by encrypting the original payment account information of the terminal by using the second encryption algorithm.

In an embodiment, the transformed payment account information does not carry the random number; and the anonymous account determining unit is configured to: perform second combination processing on the random number and the first payment account information to obtain the anonymous payment account information.

In an embodiment, the transformed payment account information carries the random number; and the anonymous account determining unit is configured to: directly determine the first payment account information as the anonymous payment account information.

In an embodiment, the terminal that performs a payment service is a terminal that provides payment account information; and the payment processing unit is configured to: provide the anonymous payment account information to another terminal.

In an embodiment, the terminal that performs a payment service is a terminal that provides a payment bill to a server; and the payment processing unit is configured to: generate an anonymous payment bill by using the anonymous payment account information; and send the anonymous payment bill to the server.

According to a fourth aspect, a server is further provided, including a receiving unit, configured to receive an anonymous payment bill; an account obtaining unit, configured to obtain anonymous payment account information from the anonymous payment bill; a decryption processing unit, configured to perform decryption processing by using a preset private key, a first decryption algorithm, and the anonymous payment account information, to obtain transformed payment account information, where the private key corresponds to a public key obtained by a terminal that performs a payment service; a random number obtaining unit, configured to obtain a random number; an inverse transform processing unit, configured to perform inverse transform processing on the transformed payment account information by using the random number to obtain original payment account information; and a deduction processing unit, configured to perform bill deduction processing according to the original payment account information.

In an embodiment, the transformed payment account information does not carry the random number; the random number acquisition unit is configured to: perform second de-combination processing on the anonymous payment account information, and extract the random number from payment account information obtained after the second de-combination processing; and the decryption processing unit is configured to: extract first payment account information from the payment account information obtained after the second de-combination processing; and decrypt the first payment account information by using the private key and the first decryption algorithm.

In an embodiment, the transformed payment account information carries the random number; the decryption processing unit is configured to decrypt the anonymous payment account information by using the private key and the first decryption algorithm; and the random number acquisition unit is configured to: perform first de-combination processing on the decrypted payment account information, and extract the random number from payment account information obtained after the first de-combination processing.

According to a fifth aspect, a computing device is provided and includes a memory and a processor. Executable code is stored in the memory, and when executing the executable code, the processor implements the method provided in any embodiment of this specification.

In the payment service implementation method and apparatus provided in embodiments of this specification, the first payment account information used to obtain the anonymous payment account information is obtained through encryption using the public key. When the payment operation is performed by using the anonymous payment account information, even if another terminal obtains the anonymous payment account information, the original payment account information cannot be decrypted from the anonymous payment account information because of having no private key corresponding to the public key, thereby reducing a risk that the payment account information is leaked. In addition, because the public key used for each time of encryption is the same and the encrypted original payment account information is also the same, to avoid that anonymous payment account information obtained after each time of encryption using the public key is the same, a random number can be used to implement interference processing. In each time of interference processing, transform processing is performed on the same original payment information by using the random number, and the transformed payment account information obtained each time is different, so information encrypted each time by using the public key is different, and therefore, anonymous payment account information obtained each time is different. That is, the original payment account information of the terminal can be provided in an encryption manner, and content of the encrypted original payment account information provided each time is different. In this way, another terminal can be further prevented from performing identity locking by using the same anonymous payment account information. Therefore, the method provided in the embodiments of the specification can reduce a risk of leakage of the payment account information.

BRIEF DESCRIPTION OF DRAWINGS

To describe technical solutions in embodiments of this specification or in the existing technology more clearly, the following briefly describes the accompanying drawings needed for describing the embodiments or the existing technology. Clearly, the accompanying drawings in the following descriptions show some embodiments of this specification, and a person of ordinary skill in the art can still derive other drawings from these accompanying drawings without creative efforts.

DESCRIPTION OF EMBODIMENTS

The following describes the solutions provided in this specification with reference to the accompanying drawings.

In an existing payment service implementation method, one party that provides payment bill information directly provides original payment account information to the other party, and the other party also generates a payment bill by using the original payment account information, thereby causing leakage of the payment account information. To reduce a risk of leakage of the payment account information, the provider of the payment account information cannot directly provide the original payment account information to the other party, and the other party cannot directly generate a payment bill by using the original payment account information. Therefore, anonymous processing needs to be performed on the original payment account information.

In an embodiment of this specification, anonymous processing on original payment account information can be performed in a manner of encryption using a public key and decryption using a private key. A terminal encrypts the original payment account information by using the public key to obtain anonymous payment account information, and another terminal that obtains the anonymous payment account information cannot obtain the original payment account information from the anonymous payment account information because of having no private key.

In addition, in consideration that for the same original payment account information, the public key used for each time of encryption and the encrypted original payment account information are the same, that is, content of the obtained encrypted payment account information is the same, and the encrypted payment account information is directly used as the anonymous payment account information, another terminal may perform identity locking by using the same anonymous payment account information. Therefore, interference processing can be performed, so content of anonymous payment account information obtained each time is different for the same original payment account information. Specifically, the interference processing can be implemented by using a random number.

The following describes specific implementations of the previous concept.

Figure 1:
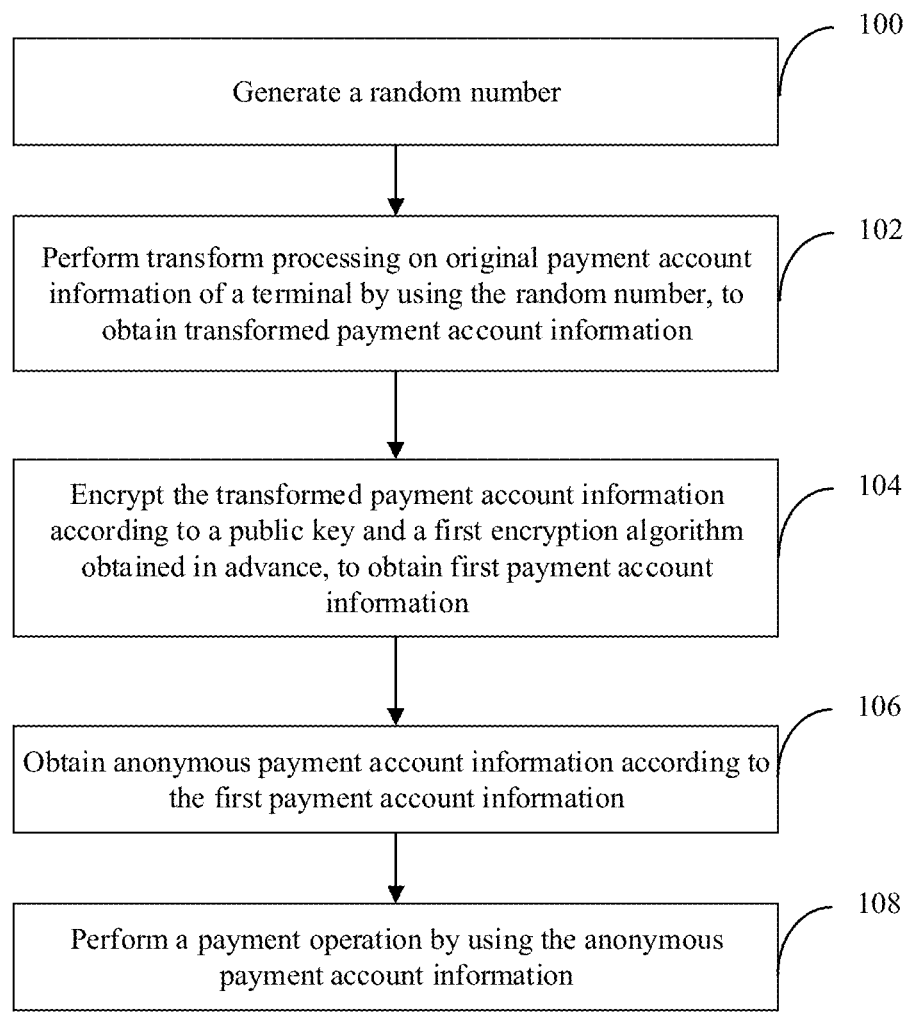
FIG. 1 is a flowchart illustrating a payment service implementation method, according to an embodiment of this specification.

FIG. 1 is a flowchart illustrating a payment service implementation method, according to an embodiment. It can be understood that the method can be performed by any apparatus, device, platform, or device cluster that has computing and processing capabilities. Referring to FIG. 1, the method is applied to a terminal that performs a payment service. Specific implementation includes:

Step 100: Generate a random number.

Step 102: Perform transform processing on original payment account information of the terminal by using the random number, to obtain transformed payment account information.

Step 104: Encrypt the transformed payment account information according to a public key obtained from a server and a first encryption algorithm, to obtain first payment account information.

Step 106: Obtain anonymous payment account information according to the first payment account information.

Step 108: Perform a payment operation by using the anonymous payment account information.

In the payment service implementation method shown in FIG. 1, the first payment account information used to obtain the anonymous payment account information is obtained through encryption using the public key. When the payment operation is performed by using the anonymous payment account information, even if another terminal obtains the anonymous payment account information, the original payment account information cannot be decrypted from the anonymous payment account information because of having no private key corresponding to the public key, thereby reducing a risk that the payment account information is leaked. In addition, because the public key used for each time of encryption is the same and the encrypted original payment account information is also the same, to avoid that anonymous payment account information obtained after each time of encryption using the public key is the same, a random number may be used to implement interference processing. In each time of interference processing, transform processing is performed on the same original payment information by using the random number, and the transformed payment account information obtained each time is different, so that information encrypted each time by using the public key is different, and therefore, anonymous payment account information obtained each time is different. That is, the original payment account information of the terminal can be provided in an encryption manner, and content of the encrypted original payment account information provided each time is different. In this way, another terminal can be further prevented from performing identity locking by using the same anonymous payment account information. Therefore, the method provided in this embodiment of the specification can reduce a risk of leakage of the payment account information.

The following describes an execution manner of each step shown in FIG. 1.

In step 100, the random number is generated.

The random number is a random number sequence, and a method for generating the random number can be as follows: A user randomly enters a number, then the random number sequence is generated by using a random function according to the number entered by the user, and the generated random number sequence is used as an actual used random number. Or the method for generating the random number can be as follows: A random number sequence is generated by using a random number generator as a basis, then the random number sequence is rearranged by using another generator, and a new number sequence obtained after the arranging is used as an actual used random number.

In step 102, transform processing is performed on the original payment account information of the terminal according to the generated random number, to obtain the transformed payment account information.

The original payment account information of the terminal is used to represent a real identity of the terminal, and the original payment account information can include but is not limited to at least one of a user name, an account number, a bank card number, an identity card number, and a nickname.

When transform processing is performed on the original payment account information in step 102, multiple transform processing manners may be used, for example, Manner 1: encryption processing is performed by using the random number; and Manner 2: content rearranging is performed by using the random number.

When transform processing is performed on the original payment account information in Manner 1, the terminal stores a second encryption algorithm negotiated with the server, and the original payment account information may be encrypted by using the second encryption algorithm. In this case, when the random number is generated in step 100, according to a key length of the second encryption algorithm, the random number whose length is equal to the key length needs to be generated.

Specifically, the performing transform processing on the original payment account information of the terminal by using the random number in step 102 includes: using the random number as the key of the second encryption algorithm, and encrypting the original payment account information of the terminal by using the second encryption algorithm.

In this embodiment of this specification, the second encryption algorithm can be an advanced encryption standard (AES) encryption algorithm or an SM4 encryption algorithm.

When transform processing is performed on the original payment account information in Manner 2, the random number can be inserted into bytes corresponding to the original payment account information, or the random number is concatenated with the bytes of the original payment account information, to implement transform processing on the original payment account information.

The random number for performing transform processing on the original payment account information is randomly generated on the terminal. To ensure that the server can perform inverse transform processing on the transformed payment account information to obtain the original payment account information of the terminal, the server needs to obtain the random number, that is, the random number needs to be carried in anonymous payment account information provided to the outside.

In an embodiment of this specification, when transform processing is performed on the original payment account information in step 102, after preliminary transform processing is completed in Manner 1 or Manner 2, the following step (denoted as step S) can be further performed, including: performing first combination processing on the random number and payment account information obtained after the preliminary transform processing, so the random number is carried in the transformed payment account information. For example, in Manner 1, after the encrypting the original payment account information of the terminal by using the second encryption algorithm, and before the obtaining transformed payment account information, the method further includes: performing first combination processing on the random number and second payment account information to obtain the transformed payment account information, where the second payment account information is payment account information obtained by encrypting the original payment account information of the terminal by using the second encryption algorithm.

In step 104, the terminal obtains the public key and the first encryption algorithm in advance, and encrypts, according to the obtained public key and first encryption algorithm, the transformed payment account information obtained in step 102 to obtain the first payment account information.

The anonymous payment bill generated when the payment operation is performed needs to be sent to the server, and the server decrypts the anonymous payment account information in the anonymous payment bill. Therefore, the public key and the first encryption algorithm may be obtained in advance from the server.

Specifically, before performing the payment service, the terminal can first perform an anonymous function application or a registration request to the server, and receive the public key and the first encryption algorithm that are sent by the server for the application or the registration request, where the first encryption algorithm is an asymmetric encryption algorithm. It is worthwhile to note that, when performing a payment operation, different terminals that perform a payment service need to send anonymous payment bills to the server for processing. Therefore, public keys and first encryption algorithms that are obtained by different terminals that perform a payment service from the server are the same.

In addition, a manner in which the terminal obtains the public key from the server can alternatively be obtaining a certificate that includes the public key. Based on a certificate mechanism, before the public key is used for encryption, the certificate can be authenticated at a third-party organization, so as to ensure that the received certificate is a valid certificate sent by the server.

In step 106, the anonymous payment account information is obtained according to the first payment account information obtained in step 104.

As described in step 102, the random number needs to be obtained by the server, that is, the random number needs to be carried in the anonymous payment account information. In an embodiment of this specification, step 102 includes two manners. Manner A is that the transformed payment account information does not carry the random number, and Manner B is that the transformed payment account information carries the random number. For the two manners, processing manners of step 106 are different. The following describes specific implementation.

Manner A: The transformed payment account information does not carry the random number, but after encryption processing is performed, the encrypted payment account information is combined with the random number.

In Manner A, a processing sequence is: performing transform processing on the original payment account information; then, encrypting the transformed payment account information that does not carry the random number; and then, combining the encrypted payment account information with the random number to obtain the anonymous payment account information.

Correspondingly, corresponding to Manner A, the obtaining the anonymous payment account information according to the first payment account information in step 106 includes: performing second combination processing on the random number and the first payment account information to obtain the anonymous payment account information.

A manner of performing second combination processing on the random number and the first payment account information can include but is not limited to: performing sequential splicing of the random number and the first payment account information, inserting the random number into the first payment account information, and performing an exclusive OR operation on the random number and the first payment account information.

Further, the payment account information obtained after the second combination processing can be calculated by using an integrity calculation rule. For example, hash calculation is performed, and the anonymous payment account information is obtained after the calculation is completed.

Manner B: Before encryption processing is performed, the transformed payment account information carries the random number.

In Manner B, a processing sequence is: performing transform processing on the original payment account information; then, carrying the random number in the transformed payment account information (for example, the random number is carried in the transformed payment account information by using the processing in step S); and then, encrypting the transformed payment account information that carries the random number to obtain the anonymous payment account information.

Correspondingly, corresponding to Manner B, the obtaining the anonymous payment account information according to the first payment account information in step 106 includes: directly determining the first payment account information as the anonymous payment account information.

In step 108, a payment operation is performed by using the anonymous payment account information.

In practice, one of two terminals that perform a payment service is used to provide payment account information, and the other terminal is used to provide a payment bill to the server. Processing processes in which the two terminals perform a payment operation by using the anonymous payment account information are different. The method shown in FIG. 1 is applicable to both a terminal that provides payment account information (that is, a terminal that performs a payment service is a terminal that provides payment account information), and a terminal that receives the payment account information and generates a payment bill (that is, a terminal that performs a payment service is a terminal that provides a payment bill to the server).

In an embodiment of this specification, when a terminal that performs a payment service is a terminal that provides payment account information, the performing the payment operation by using the anonymous payment account information in step 108 includes: providing the anonymous payment account information to another terminal.

A manner of providing the anonymous payment account information to another terminal may include near field communication (NFC), Wireless Fidelity (Wi-Fi), 3G/4G/5G, a technology of swiping card by using a point of sale (POS) machine, a quick response code scanning technology, a bar code scanning technology, Bluetooth, infrared, a short message service (SMS), and a multimedia messaging service (MMS).

It is worthwhile to note that the terminal that provides payment account information can be a payee or a payer. The quick response code scanning technology is used as an example. When the terminal that provides payment account information is a payee, the terminal that provides payment account information can generate a collection code according to the obtained anonymous payment account information, and the terminal that provides a payment bill to the server scans the collection code to obtain the anonymous payment account information. When the terminal that provides payment account information is a payer, the terminal that provides payment account information can generate a payment code according to the obtained anonymous payment account information, and the terminal that provides a payment bill to the server scans the payment code to obtain the anonymous payment account information.

In an embodiment of this specification, when the terminal that performs a payment service is a terminal that provides a payment bill to the server, the performing a payment operation by using the anonymous payment account information in step 108 includes: generating an anonymous payment bill by using the anonymous payment account information; and sending the anonymous payment bill to the server.

The terminal that provides a payment bill to the server sends the anonymous payment bill to the server after generating the anonymous payment bill. Therefore, the terminal that provides a payment bill to the server can anonymize the original payment account information of the terminal by using the previous step 100 to step 106, and the generated anonymous payment bill includes two pieces of anonymous payment account information (one is corresponding to the terminal that provides payment account information, and the other is corresponding to the terminal that provides a payment bill to the server); or may not anonymize the original payment account information of the terminal, and the generated anonymous payment bill includes one piece of original payment account information (corresponding to the terminal that provides a payment bill to the server) and one piece of anonymous payment account information (corresponding to the terminal that provides payment account information).

To ensure that the server can implement bill deduction processing according to the anonymous payment bill, the anonymous payment bill further needs to include at least a payer, a payee, and a payment amount, so that after obtaining the original payment account information from the anonymous payment account information, the server allots payment to the payee.

Figure 2:
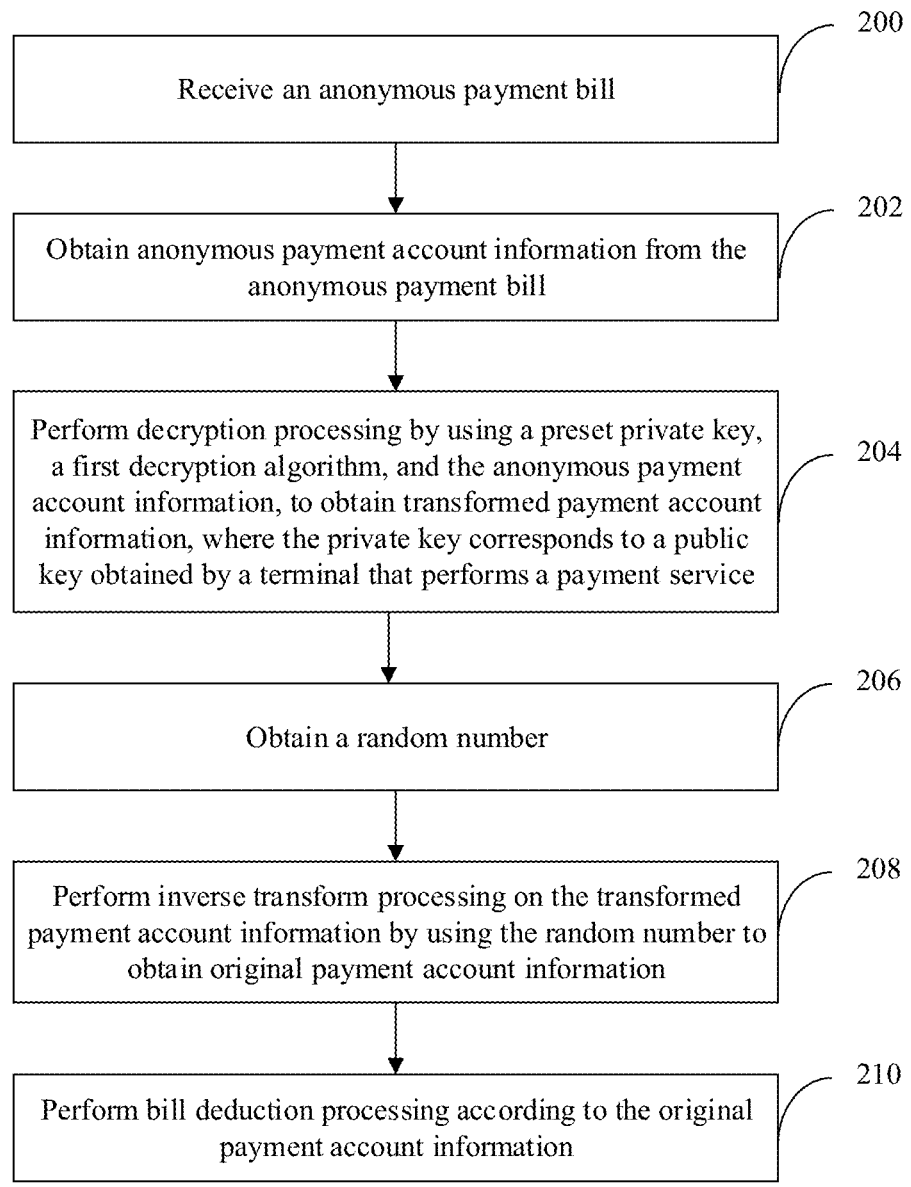
FIG. 2 is a flowchart illustrating a payment service implementation method, according to another embodiment of this specification.

FIG. 2 is a flowchart illustrating a payment service implementation method, according to an embodiment. It can be understood that the method can be performed by any apparatus, device, platform, or device cluster that has computing and processing capabilities. Referring to FIG. 2, the method is applied to a server. Specific implementation includes:

Step 200: Receive an anonymous payment bill.

Step 202: Obtain anonymous payment account information from the anonymous payment bill.

Step 204: Perform decryption processing by using a preset private key, a first decryption algorithm, and the anonymous payment account information, to obtain transformed payment account information, where the private key corresponds to a public key obtained by a terminal that performs a payment service.

Step 206: Obtain a random number.

Step 208: Perform inverse transform processing on the transformed payment account information by using the random number to obtain original payment account information.

Step 210: Perform bill deduction processing according to the original payment account information.

In the payment service implementation method shown in FIG. 2, because the private key and the first decryption algorithm are predetermined in the server, and the private key is corresponding to the public key used when the terminal that performs a payment service performs encryption, the anonymous payment account information can be decrypted by using the private key and the first decryption algorithm. Because the terminal that performs a payment service performs transform processing on the original payment account information by using the random number during encryption, and the random number is carried in the anonymous payment account information, the server can obtain the random number from the anonymous payment account information, so inverse transform processing can be performed on the decrypted payment account information by using the random number, so as to obtain the original payment account information. As such, the server that stores the private key can obtain the original payment account information from the anonymous payment account information, so as to perform bill deduction processing. Because of having no private key, another terminal cannot obtain the original payment account information from the anonymous payment account information, thereby reducing a risk of leakage of the payment account information.

The following describes an execution manner of each step shown in FIG. 2.

Before step 200, the server receives an anonymous function application or a registration request sent by the terminal that performs a payment service, and the server generates a public-private key pair of a first encryption algorithm. The first encryption algorithm is an asymmetric encryption algorithm. The server sends the public key in the key pair to the terminal that sends the anonymous function application or the registration request to the server, which locally stores the private key corresponding to the public key and the first decryption algorithm corresponding to the first encryption algorithm.

In step 200 and step 202, the anonymous payment bill is sent by a terminal that provides a payment bill to the server. If the terminal that provides a payment bill to the server performs anonymous processing on original payment account information of the terminal before generating an anonymous payment bill, the anonymous payment bill includes two pieces of anonymous payment account information (one is corresponding to the terminal that provides payment account information and the other is corresponding to the terminal that provides a payment bill to the server). If the terminal that provides a payment bill to the server does not perform anonymous processing on the original payment account information of the terminal before generating the anonymous payment bill, the anonymous payment bill includes one piece of original payment account information (corresponding to the terminal that provide a payment bill to the server) and one piece of anonymous payment account information (corresponding to the terminal that provides payment account information).

To ensure that the server can complete bill deduction processing according to the anonymous payment bill, the anonymous payment bill includes at least a payer, a payee, and a payment amount.

In step 204 and step 206, to implement decryption processing on the anonymous payment account information, a random number carrying manner needs to be first determined, where there are two random number carrying manners. Manner A is that the transformed payment account information does not carry the random number, and Manner B is that the transformed payment account information carries the random number.

In an anonymous processing process of the terminal that performs a payment service, whether the random number is carried in Manner A or Manner B affects processing manners of step 204 and step 206, and the processing manners are specifically described.

If the terminal that performs a payment service carries the random number in Manner A, in step 206, the random number needs to be obtained from the anonymous payment account information. In step 204, the random number needs to be first extracted from the anonymous payment account information, and decryption processing is performed on the payment account information obtained after the random number is extracted. Corresponding to Manner A, the obtaining the random number in step 206 includes: performing second de-combination processing on the anonymous payment account information, and extracting the random number from payment account information obtained after the second de-combination processing. In step 204, the performing decryption processing by using the preset private key, the first decryption algorithm, and the anonymous payment account information includes: extracting first payment account information from the payment account information obtained after the second de-combination processing; and decrypting the first payment account information by using the private key and the first encryption algorithm.

The second de-combination processing manner is corresponding to a manner in which the terminal performs second combination processing, and the two processing manners are reversible processes.

If the terminal that performs a payment service carries the random number in Manner B, in step 204, the anonymous payment account information can be directly decrypted by using the private key. In step 206, the random number needs to be obtained from the decrypted payment account information. Corresponding to Manner B, in step 204, the performing decryption processing by using a preset private key, a first decryption algorithm, and the anonymous payment account information includes: decrypting the anonymous payment account information by using the private key and the first decryption algorithm. In step 206, the obtaining a random number includes: performing first de-combination processing on the decrypted payment account information, and extracting the random number from payment account information obtained after the first de-combination processing.

The decrypted payment account information is the transformed payment account information, and the transformed payment account information on the terminal is obtained after first combination processing is performed on the random number and the second payment account information, and the first de-combination processing manner is corresponding to a manner in which the terminal performs first combination processing, and the two processing manners are reversible processes.

In step 208, after the random number is obtained, inverse transform processing can be performed on the transformed payment account information by using the random number to obtain the original payment account information.

In an embodiment of this specification, when performing transform processing on the original payment account information, the terminal can use multiple transform processing manners, for example, Manner 1 of performing encryption processing by using the random number, and Manner 2 of performing content rearranging by using the random number. When the terminal performs transform processing in different transform processing manners, the server needs to perform inverse transform processing in different manners.

When the terminal performs transform processing in Manner 1, and the terminal carries the random number in Manner A, the server stores the second decryption algorithm corresponding to the second encryption algorithm used when the terminal performs encryption, and the server decrypts the transformed payment account information by using the obtained random number and the second decryption algorithm, to obtain the original payment account information.

When the terminal performs transform processing in Manner 1, and the terminal carries the random number in Manner B, likely, the server stores the second decryption algorithm corresponding to the second encryption algorithm used by the terminal during encryption, and the server decrypts, by using the obtained random number and the second decryption algorithm, payment account information obtained after the random number is extracted from payment account information obtained after first de-combination processing, to obtain the original payment account information.

When the terminal performs transform processing in Manner 2, and the terminal carries the random number in Manner A, the server performs inverse transform processing on the transformed payment account information to obtain the original payment account information.

When the terminal performs transform processing in Manner 2, and the terminal carries the random number in Manner B, the server performs inverse transform processing on the payment account information obtained after the random number is extracted from the payment account information obtained after first de-combination processing, so as to obtain the original payment account information.

In step 210, the server may perform allotment processing from the payer to the payee according to the payer, the payee, the payment amount, and the decrypted original payment account information in the anonymous payment bill, so as to complete bill deduction processing.

It is worthwhile to note that, to ensure security of a private key of an asymmetric encryption algorithm generated by the server in long-term use, a public-private key pair periodic update mechanism can be implemented. For example, the server regenerates a public-private key pair of the asymmetric encryption algorithm once at an interval of a time period. When the terminal that performs a payment service interacts with the server, a public key in the regenerated public-private key pair is sent to the terminal, so the terminal performs encryption by using the regenerated public key in next time of anonymity.

After step 210, the server can further send a bill deduction processing result to the two terminals, but it needs to be ensured that, in the bill deduction processing result sent to the terminal that provides a payment bill to the server, the original payment account information of the terminal that provides payment account information is anonymized, and in the bill deduction processing result sent to the terminal that provides payment account information, the original payment account information of the terminal that provides a payment bill to the server is anonymized.

The following uses an example in which a terminal A and a terminal B perform a payment service, where the terminal A is used to provide payment account information, and the terminal B is used to send a payment bill to a server, to describe an interaction process among the terminal A, the terminal B, and the server.

Figure 3:
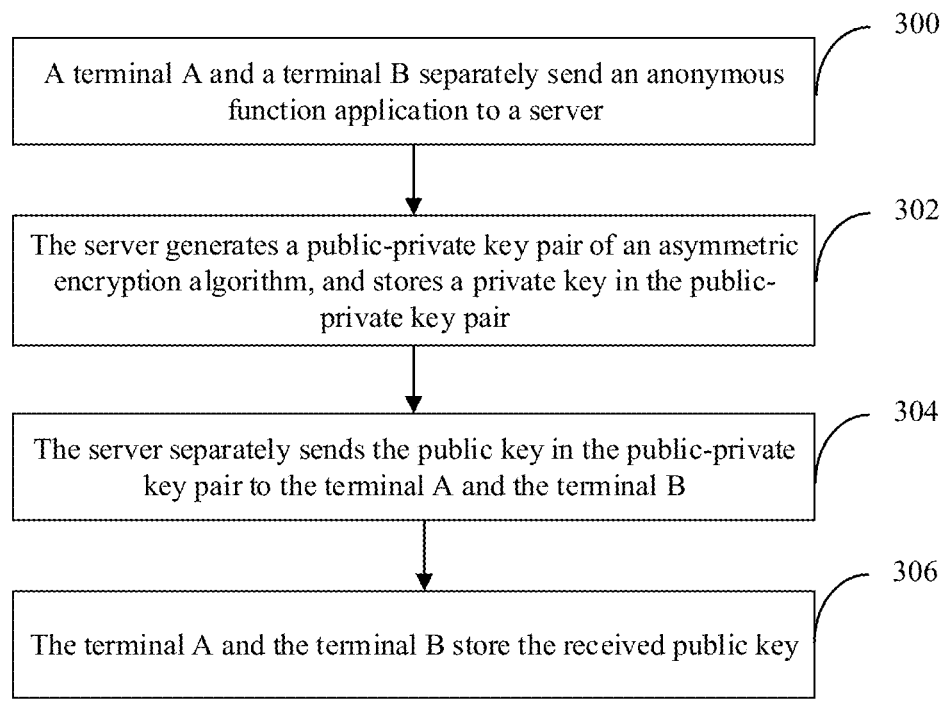
FIG. 3 is a flowchart of separately applying for an anonymous function by a terminal A and a terminal B to a server, according to an embodiment of this specification.

FIG. 3 is an interaction flowchart of separately applying for an anonymous function by the terminal A and the terminal B to the server, according to an embodiment of this specification. The method includes step 300: The terminal A and the terminal B separately send an anonymous function application to the server.

Step 302: The server generates a public-private key pair of an asymmetric encryption algorithm, and stores a private key in the public-private key pair.

In a subsequent process, the server can further need to perform anonymous processing on original payment account information of the terminal. Therefore, the server can further store the public key.

Step 304: The server separately sends the public key in the public-private key pair to the terminal A and the terminal B.

Step 306: The terminal A and the terminal B store the received public key.

It can be understood that a sequence does not exist in step 300 and step 302, which can be that the server first performs step 302, then a terminal sends an anonymous function application to the server, and the server sends the generated public key to the terminal. Or the server performs step 302 after receiving for the first time the anonymous function application sent by the terminal to the server. In this case, when a subsequent terminal sends the anonymous function application to the server, the server can directly send the generated public key to the subsequent terminal.

Figure 4:
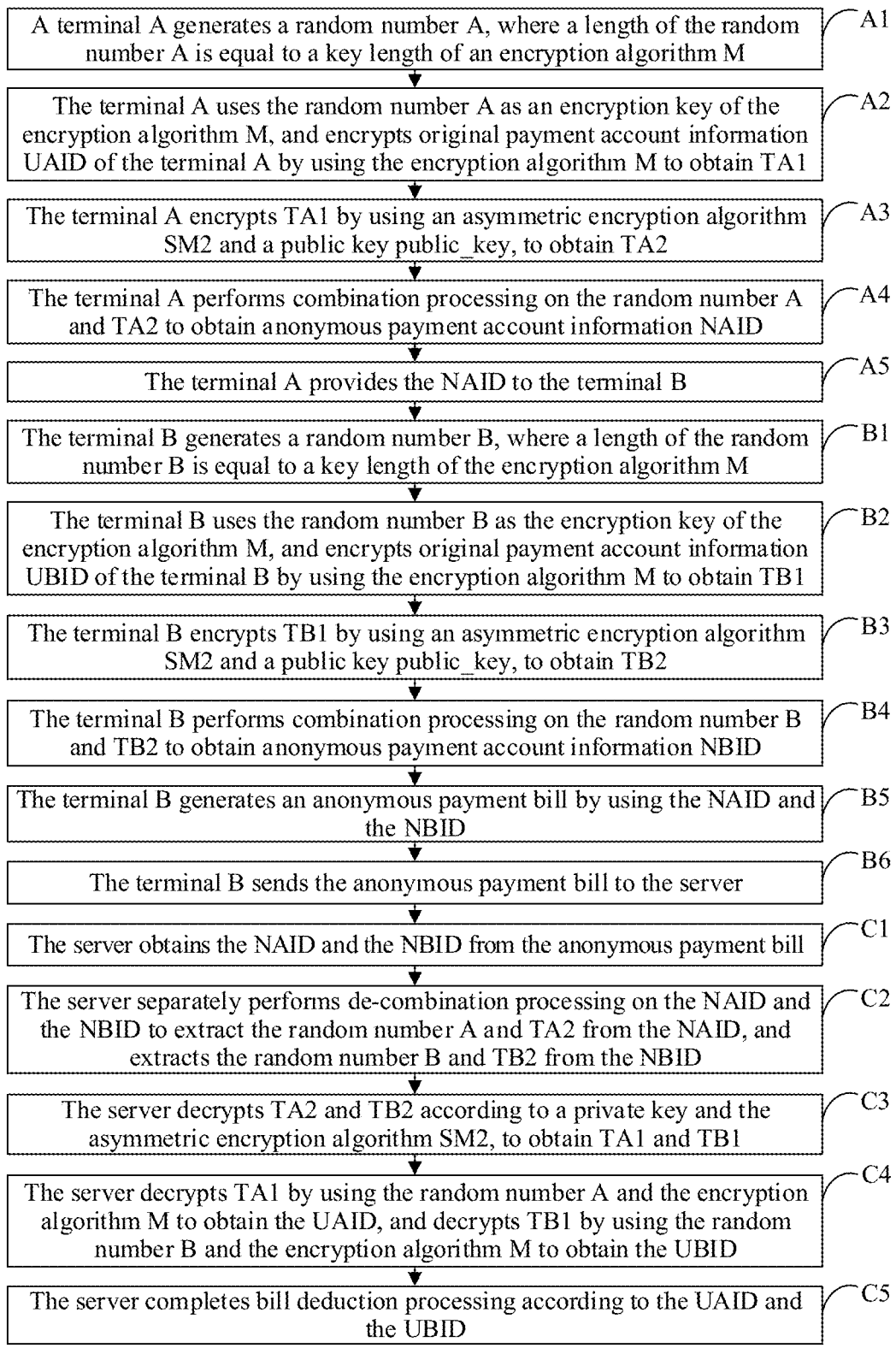
FIG. 4 is a flowchart of implementing a payment service among a terminal A, a terminal B, and a server, according to an embodiment of this specification.

FIG. 4 is an interaction flowchart of implementing a payment service among the terminal A, the terminal B, and the server, according to an embodiment of this specification. The method includes:

Step A1: The terminal A generates a random number A, where a length of the random number A is equal to a key length of an encryption algorithm M.

Step A2: The terminal A uses the random number A as an encryption key of the encryption algorithm M, and encrypts original payment account information UAID of the terminal A by using the encryption algorithm M to obtain TA1, where TA1=M(A, UAID).

Step A3: The terminal A encrypts TA1 by using an asymmetric encryption algorithm SM2 and a public key public_key, to obtain TA2, where TA2=SM2 (public_key, TA1).

Step A4: The terminal A performs combination processing on the random number A and TA2 to obtain anonymous payment account information NAID, where NAID={A, TA2} array.

Step A5: The terminal A provides the NAID to the terminal B.

Step B1: The terminal B generates a random number B, where a length of the random number B is equal to a key length of the encryption algorithm M.

Step B2: The terminal B uses the random number B as the encryption key of the encryption algorithm M, and encrypts original payment account information UBID of the terminal B by using the encryption algorithm M to obtain TB1, where TB1=M(B, UBID).

Step B3: The terminal B encrypts TB1 by using an asymmetric encryption algorithm SM2 and a public key public_key, to obtain TB2, where TB2=SM2(public key, TB1).

Step B4: The terminal B performs combination processing on the random number B and TB2 to obtain anonymous payment account information NBID, where NBID={B, TB2} array.

Step B5: The terminal B generates an anonymous payment bill by using the NAID and the NBID.

Step B6: The terminal B sends the anonymous payment bill to the server.

Step C1: The server obtains the NAID and the NBID from the anonymous payment bill.

Step C2: The server separately performs de-combination processing on the NAID and the NBID to extract the random number A and TA2 from the NAID, and extracts the random number B and TB2 from the NBID.

Step C3: The server performs decryption processing on TA2 and TB2 according to a private key and the asymmetric encryption algorithm SM2, to obtain TA1 and TB1.

Step C4: The server decrypts TA1 by using the random number A and the encryption algorithm M to obtain the UAID, and decrypts TB1 by using the random number B and the encryption algorithm M to obtain the UBID.

Step C5: The server completes bill deduction processing according to the UAID and the UBID.

The previous is a process of implementing a payment service among the terminal A, the terminal B, and the server.

Figure 5:
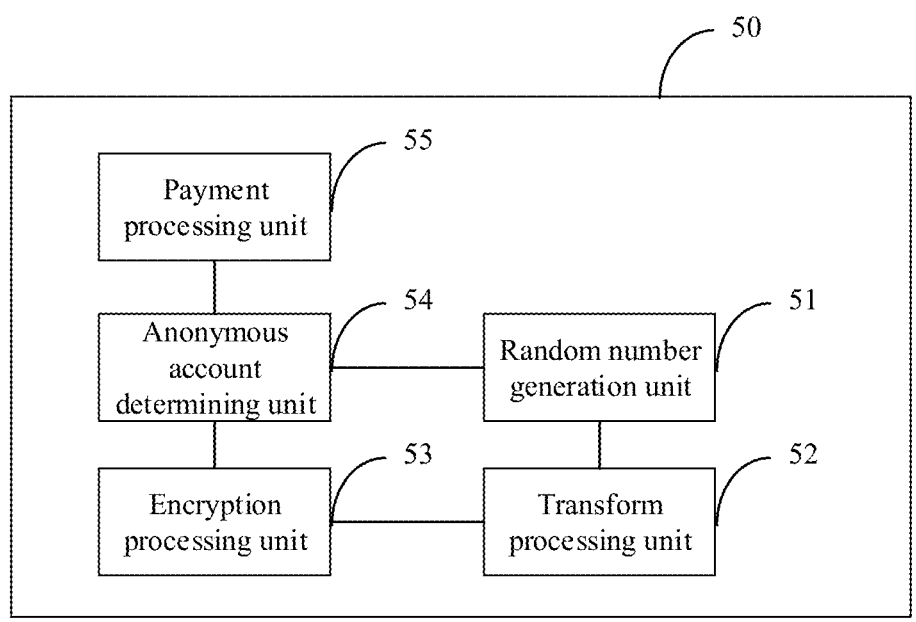
FIG. 5 is a schematic structural diagram illustrating a payment service implementation apparatus, according to an embodiment of this specification.

In an embodiment of another aspect, a payment service implementation apparatus is further provided, and the apparatus is disposed in a terminal that performs a payment service. FIG. 5 shows a payment service implementation apparatus according to an embodiment. It can be understood that the apparatus can be implemented by any apparatus, device, platform, or device cluster that has computing and processing capabilities. As shown in FIG. 5, the apparatus 50 includes: a random number generation unit 51, configured to generate a random number; a transform processing unit 52, configured to perform transform processing on original payment account information of the terminal by using the random number, to obtain transformed payment account information; an encryption processing unit 53, configured to encrypt the transformed payment account information according to a public key and a first encryption algorithm obtained in advance, to obtain first payment account information; an anonymous account determining unit 54, configured to obtain anonymous payment account information according to the first payment account information; and a payment processing unit 55, configured to perform a payment operation by using the anonymous payment account information.

In a possible implementation, the random number generation unit 51 is configured to generate, according to a key length of a second encryption algorithm, the random number whose length is equal to the key length; and the transform processing unit 52 is configured to: use the random number as a key of the second encryption algorithm, and encrypt the original payment account information of the terminal by using the second encryption algorithm.

In a possible implementation, the transform processing unit 52 is further configured to perform first combination processing on the random number and second payment account information to obtain the transformed payment account information, where the second payment account information is payment account information obtained by encrypting the original payment account information of the terminal by using the second encryption algorithm.

In a possible implementation, the transformed payment account information does not carry the random number; and the anonymous account determining unit 54 is configured to: perform second combination processing on the random number and the first payment account information to obtain the anonymous payment account information.

In a possible implementation, the transformed payment account information carries the random number; and the anonymous account determining unit 54 is configured to: directly determine the first payment account information as the anonymous payment account information.

In a possible implementation, the terminal that performs a payment service is a terminal that provides payment account information; and the payment processing unit 55 is configured to: provide the anonymous payment account information to another terminal.

In a possible implementation, the terminal that performs a payment service is a terminal that provides a payment bill to a server; and the payment processing unit 55 is configured to: generate an anonymous payment bill by using the anonymous payment account information; and send the anonymous payment bill to the server.

The previous describes a payment service implementation apparatus in a terminal that performs a payment service, which can reduce a risk of leakage of payment account information.

Figure 6:
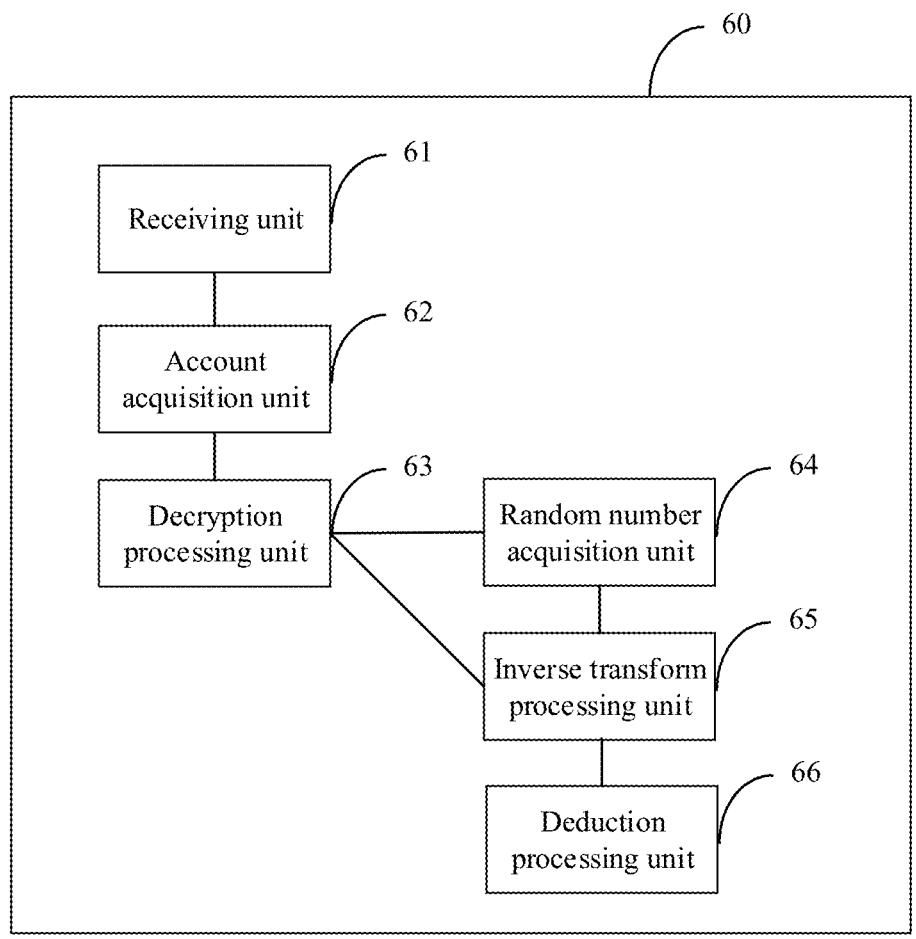
FIG. 6 is schematic structural diagram illustrating a server, according to an embodiment of this specification.

In an embodiment of another aspect, a server is further provided. FIG. 6 shows a server of an embodiment. It can be understood that the apparatus can be implemented by any apparatus, device, platform, or device cluster that has computing and processing capabilities. As shown in FIG. 6, the server 60 includes: a receiving unit 61, configured to receive an anonymous payment bill; an account obtaining unit 62, configured to obtain anonymous payment account information from the anonymous payment bill; a decryption processing unit 63, configured to perform decryption processing by using a preset private key, a first decryption algorithm, and the anonymous payment account information, to obtain transformed payment account information, where the private key corresponds to a public key obtained by a terminal that performs a payment service; a random number obtaining unit 64, configured to obtain a random number; an inverse transform processing unit 65, configured to perform inverse transform processing on the transformed payment account information by using the random number to obtain original payment account information; and a deduction processing unit 66, configured to perform bill deduction processing according to the original payment account information.

In a possible implementation, the transformed payment account information does not carry the random number; the random number obtaining unit 64 is configured to: perform second de-combination processing on the anonymous payment account information, and extract the random number from payment account information obtained after the second de-combination processing; and the decryption processing unit 63 is configured to: extract first payment account information from the payment account information obtained after the second de-combination processing; and decrypt the first payment account information by using the private key and the first decryption algorithm.

In a possible implementation, the transformed payment account information carries the random number; the decryption processing unit 63 is configured to decrypt the anonymous payment account information by using the private key and the first decryption algorithm; and the random number obtaining unit 64 is configured to: perform first de-combination processing on the decrypted payment account information, and extract the random number from payment account information obtained after the first de-combination processing.

The previous describes a server used to implement a payment service, which can reduce a risk of leakage of payment account information.

It is worthwhile to note that a structure shown in this embodiment of this specification does not constitute a specific limitation on a payment service implementation apparatus and/or a server. In some other embodiments of this specification, the payment service implementation apparatus and/or the server can include more or fewer components than those shown in the figure, or combine some components, or split some components, or have different component arrangements. The components shown in the figure may be implemented by hardware, software, or a combination of software and hardware.

Content such as information exchange and execution processes between units in the previous apparatus is based on the same concept as that in the method embodiment of this specification. For specific content, refer to the description in the method embodiment of this specification. Details are omitted here for simplicity.

In an embodiment of still another aspect, a computing device is further provided and includes a memory and a processor. Executable code is stored in the memory, and when executing the executable code, the processor implements the payment service implementation method in the foregoing embodiments.

The embodiments in this specification are described in a progressive way. For the same or similar parts of the embodiments, references can be made to the embodiments. Each embodiment focuses on a difference from other embodiments. Particularly, an apparatus embodiment is similar to a method embodiment, and therefore is described briefly. For a related part, references can be made to some descriptions in the method embodiment.

A person skilled in the art should be aware that in the previous one or more examples, functions described in the present invention can be implemented by hardware, software, pendant, or any combination thereof. When the present invention is implemented by software, the functions can be stored in a computer readable medium or transmitted as one or more instructions or code in the computer readable medium.

The objectives, technical solutions, and benefits of the present invention are further described in detail in the earlier-described specific implementations. It should be understood that the earlier-described descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A payment service implementation method, applied to a terminal that performs a payment service, wherein the method comprises:
   generating a random number;
   performing transform processing on original payment account information of the terminal by using the random number as a key to encrypt the original payment account information;
   performing first combination processing on the random number and the encrypted original payment account information to obtain transformed payment account information;
   encrypting the transformed payment account information according to a public key and a first encryption algorithm obtained in advance, to obtain first payment account information;
   performing second combination processing on the random number and the first payment account information to obtain anonymous payment account information; and
   performing a payment operation by using the anonymous payment account information.

2. The method according to claim 1, wherein the generating a random number comprises:
   generating, according to a key length of a second encryption algorithm, the random number whose length is equal to the key length.

3. The method according to claim 1, wherein the transformed payment account information does not carry the random number.

4. The method according to claim 1, wherein the terminal that performs a payment service is a terminal that provides payment account information; and
   the performing a payment operation by using the anonymous payment account information comprises:
   providing the anonymous payment account information to another terminal.

5. The method according to claim 1, wherein the terminal that performs a payment service is a terminal that provides a payment bill to a server; and
   the performing a payment operation by using the anonymous payment account information comprises:
   generating an anonymous payment bill by using the anonymous payment account information; and
   sending the anonymous payment bill to the server.

6. A computing device, comprising a memory and a processor, wherein the memory stores executable instructions that, in response to execution by the processor, cause the computing device to:
   generate a random number;
   perform transform processing on original payment account information of the terminal by using the random number as a key to encrypt the original payment account information;
   perform first combination processing on the random number and the encrypted original payment account information to obtain transformed payment account information;
   encrypt the transformed payment account information according to a public key and a first encryption algorithm obtained in advance, to obtain first payment account information;
   perform second combination processing on the random number and the first payment account information to obtain anonymous payment account information; and
   perform a payment operation by using the anonymous payment account information.

* * * * *